(12) United States Patent
Hagiwara et al.

(10) Patent No.: US 11,978,909 B2
(45) Date of Patent: May 7, 2024

(54) ELECTRODE STRUCTURE

(71) Applicant: Toyota Jidosha Kabushiki Kaisha, Toyota (JP)

(72) Inventors: Hideki Hagiwara, Nagoya (JP); Ryuto Sakamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/355,850

(22) Filed: Jun. 23, 2021

(65) Prior Publication Data
US 2022/0006094 A1 Jan. 6, 2022

(30) Foreign Application Priority Data
Jul. 3, 2020 (JP) ................. 2020-115603

(51) Int. Cl.
*H01M 4/66* (2006.01)
*H01M 4/02* (2006.01)
(Continued)

(52) U.S. Cl.
CPC ............ *H01M 4/667* (2013.01); *H01M 4/13* (2013.01); *H01M 4/624* (2013.01); *H01M 4/663* (2013.01);
(Continued)

(58) Field of Classification Search
CPC ........ H01M 4/667; H01M 4/13; H01M 4/624; H01M 4/663; H01M 2004/021; H01M 2004/028
(Continued)

(56) References Cited

U.S. PATENT DOCUMENTS

| 36,154 A | * | 8/1862 | Kim | ............... C04B 28/10 |
| | | | | 106/793 |
| 281,163 A | * | 7/1883 | Kasamatsu | ............... G09F 3/14 |
| | | | | 40/6 |

(Continued)

FOREIGN PATENT DOCUMENTS

| CN | 105580165 A | 5/2016 |
| CN | 107735887 A | 2/2018 |

(Continued)

OTHER PUBLICATIONS

Kazuomi (machine translation) (Year: 2018).*
Fujiwara (machine translation) (Year: 2009).*

*Primary Examiner* — Matthew T Martin
*Assistant Examiner* — Paul Christian St Wyrough
(74) *Attorney, Agent, or Firm* — Dinsmore & Shohl LLP

(57) ABSTRACT

An electrode structure includes a positive electrode layer and a positive electrode collector member. The positive electrode collector member includes a positive electrode collector foil, a carbon film, and a hot melt adhesive agent. A positive electrode total specific surface area is more than or equal to 2.2 $m^2/g$ and less than or equal to 3.0 $m^2/g$, the positive electrode total specific surface area being represented by a total of a product of weight ratio and specific surface area of a positive electrode active material, a product of weight ratio and specific surface area of a solid electrolyte, and a product of weight ratio and specific surface area of a conductive material. A softening point of the hot melt adhesive agent is more than or equal to 100° C. and less than or equal to 130° C.

13 Claims, 15 Drawing Sheets

(51) Int. Cl.
  *H01M 4/13* (2010.01)
  *H01M 4/62* (2006.01)
(52) U.S. Cl.
  CPC ............... *H01M 2004/021* (2013.01); *H01M 2004/028* (2013.01)
(58) Field of Classification Search
  USPC ...................................................... 429/232
  See application file for complete search history.

(56) References Cited

U.S. PATENT DOCUMENTS

| | | |
|---|---|---|
| 2014/0093761 A1 * | 4/2014 | Sakanaka .......... H01M 50/3425 |
| | | 429/82 |
| 2016/0164101 A1 | 6/2016 | Nagano |
| 2018/0090748 A1 | 3/2018 | Mochizuki et al. |
| 2019/0019555 A1 * | 1/2019 | Lee et al. .............. H01M 4/366 |
| 2020/0185726 A1 | 6/2020 | Kubota et al. |

FOREIGN PATENT DOCUMENTS

| | | | | |
|---|---|---|---|---|
| CN | 111276668 A | | 6/2020 | |
| EP | 2128086 A1 * | | 12/2009 | ............. C01B 31/02 |
| EP | 3352277 A1 * | | 7/2018 | ........... C09D 127/16 |
| JP | 2004-273181 A | | 9/2004 | |
| JP | 2019-145286 A | | 8/2019 | |

* cited by examiner

FIG.7

POSITIVE ELECTRODE LAYER 10

| MATERIAL | TYPE | PHYSICAL PROPERTY | BLENDING RATIO [wt%] |
|---|---|---|---|
| POSITIVE ELECTRODE ACTIVE MATERIAL | LITHIUM NICKEL MANGANESE COBALT OXIDE/LITHIUM NIOBATE | | 81.0 |
| SOLID ELECTROLYTE | LITHIUM PHOSPHORUS SULFIDE | 0.5 μm (PRIMARY GRAIN SIZE) | 16.5 |
| CONDUCTIVE MATERIAL | CARBON FIBER | φ 0.15 μm | 1.9 |
| BINDER | PVdF | - | 0.6 |
| SOLVENT | BUTYL BUTYRATE | - | 37.0 |
| TRANSFER FOIL | ALUMINUM | - | |

SEPARATOR LAYER 30

| MATERIAL | TYPE | PHYSICAL PROPERTY | BLENDING RATIO [wt%] |
|---|---|---|---|
| SOLID ELECTROLYTE | LITHIUM PHOSPHORUS SULFIDE | 0.5 μm (PRIMARY GRAIN SIZE) | 99.0 |
| BINDER | PVdF | - | 1.0 |
| SOLVENT | BUTYL BUTYRATE | - | 75.4 |
| TRANSFER FOIL | ALUMINUM | - | |

NEGATIVE ELECTRODE LAYER 20

| MATERIAL | TYPE | PHYSICAL PROPERTY | BLENDING RATIO [wt%] |
|---|---|---|---|
| NEGATIVE ELECTRODE ACTIVE MATERIAL | LTO | 0.8 μm (PRIMARY GRAIN SIZE) | 71.0 |
| SOLID ELECTROLYTE | LITHIUM PHOSPHORUS SULFIDE | 0.5 μm (PRIMARY GRAIN SIZE) | 23.9 |
| CONDUCTIVE MATERIAL | CARBON FIBER | φ 0.15 μm | 1.7 |
| BINDER | PVdF | - | 3.4 |
| SOLVENT | BUTYL BUTYRATE | - | 89.0 |
| COLLECTOR FOIL/ TRANSFER FOIL | NICKEL/ALUMINUM | - | |

POSITIVE ELECTRODE COLLECTOR MEMBER 40

| CONSTITUENT MEMBER | CONSTITUENT MATERIAL | MATERIAL | BLENDING RATIO [wt%] |
|---|---|---|---|
| POSITIVE ELECTRODE COLLECTOR FOIL | POSITIVE ELECTRODE COLLECTOR FOIL | ALUMINUM FOIL A1N30H-H18 | - |
| CARBON FILM | CONDUCTIVE MATERIAL | ACETYLENE BLACK | 20 |
| CARBON FILM | BINDER | POLYVINYLIDENE DIFLUORIDE | 80 |
| HOT MELT ADHESIVE AGENT | ADHESIVE AGENT | ETHYLENE-VINYLACETATE COPOLYMER RESIN | - |

FIG.8

| POSITIVE ELECTRODE TOTAL SPECIFIC SURFACE AREA [m²/g] | SOFTENING POINT OF HOT MELT ADHESIVE AGENT [°C] | | | | | | | |
|---|---|---|---|---|---|---|---|---|
| | 80.0 | 90.0 | 100.0 | 110.0 | 120.0 | 130.0 | 140.0 |
| 2.0 | COMPARATIVE EXAMPLE 1 × | COMPARATIVE EXAMPLE 8 × | COMPARATIVE EXAMPLE 15 × | COMPARATIVE EXAMPLE 17 × | COMPARATIVE EXAMPLE 19 × | COMPARATIVE EXAMPLE 21 × | COMPARATIVE EXAMPLE 23 × |
| 2.2 | COMPARATIVE EXAMPLE 2 × | COMPARATIVE EXAMPLE 9 × | EXAMPLE 1 ○ | EXAMPLE 6 ○ | EXAMPLE 11 ○ | EXAMPLE 16 ○ | COMPARATIVE EXAMPLE 24 × |
| 2.4 | COMPARATIVE EXAMPLE 3 × | COMPARATIVE EXAMPLE 10 × | EXAMPLE 2 ○ | EXAMPLE 7 ○ | EXAMPLE 12 ○ | EXAMPLE 17 ○ | COMPARATIVE EXAMPLE 25 × |
| 2.6 | COMPARATIVE EXAMPLE 4 × | COMPARATIVE EXAMPLE 11 × | EXAMPLE 3 ○ | EXAMPLE 8 ○ | EXAMPLE 13 ○ | EXAMPLE 18 ○ | COMPARATIVE EXAMPLE 26 × |
| 2.8 | COMPARATIVE EXAMPLE 5 × | COMPARATIVE EXAMPLE 12 × | EXAMPLE 4 ○ | EXAMPLE 9 ○ | EXAMPLE 14 ○ | EXAMPLE 19 ○ | COMPARATIVE EXAMPLE 27 × |
| 3.0 | COMPARATIVE EXAMPLE 6 × | COMPARATIVE EXAMPLE 13 × | EXAMPLE 5 ○ | EXAMPLE 10 ○ | EXAMPLE 15 ○ | EXAMPLE 20 ○ | COMPARATIVE EXAMPLE 28 × |
| 3.2 | COMPARATIVE EXAMPLE 7 × | COMPARATIVE EXAMPLE 14 × | COMPARATIVE EXAMPLE 16 × | COMPARATIVE EXAMPLE 18 × | COMPARATIVE EXAMPLE 20 × | COMPARATIVE EXAMPLE 22 × | COMPARATIVE EXAMPLE 29 × |

FIG.9

| | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 | COMPARATIVE EXAMPLE 10 | COMPARATIVE EXAMPLE 11 | COMPARATIVE EXAMPLE 12 | COMPARATIVE EXAMPLE 13 | COMPARATIVE EXAMPLE 14 |
|---|---|---|---|---|---|---|---|---|---|---|---|---|---|---|---|
| HOT MELT ADHESIVE AGENT | SOFTENING POINT [°C] | | | | 80 | | | | | | | 90 | | | |
| POSITIVE ELECTRODE ACTIVE MATERIAL | WEIGHT RATIO | | | | | | | 0.815 | | | | | | | |
| | SPECIFIC SURFACE AREA [$m^2/g$] | 0.83 | 0.83 | 0.83 | 1.18 | 1.53 | 1.53 | 1.53 | 0.83 | 0.83 | 0.83 | 1.18 | 1.53 | 1.53 | 1.53 |
| SOLID ELECTROLYTE | WEIGHT RATIO | | | | | | | 0.166 | | | | | | | |
| | SPECIFIC SURFACE AREA [$m^2/g$] | 6.6 | 7.8 | 9.0 | 8.5 | 7.5 | 9.1 | 9.9 | 6.6 | 7.8 | 9.0 | 8.5 | 7.5 | 9.1 | 9.9 |
| CONDUCTIVE MATERIAL | WEIGHT RATIO | | | | | | | 0.019 | | | | | | | |
| | SPECIFIC SURFACE AREA [$m^2/g$] | 12 | 12 | 12 | 14 | 16 | 16 | 16 | 12 | 12 | 12 | 14 | 16 | 16 | 16 |
| POSITIVE ELECTRODE TOTAL SPECIFIC SURFACE AREA [$m^2/g$] | | 2.0 | 2.2 | 2.4 | 2.6 | 2.8 | 3.0 | 3.2 | 2.0 | 2.2 | 2.4 | 2.6 | 2.8 | 3.0 | 3.2 |
| EVALUATION | | × | × | × | × | × | × | × | × | × | × | × | × | × | × |

FIG. 10

| | COMPARATIVE EXAMPLE 15 | EXAMPLE 1 | EXAMPLE 2 | EXAMPLE 3 | EXAMPLE 4 | EXAMPLE 5 | COMPARATIVE EXAMPLE 16 | COMPARATIVE EXAMPLE 17 | EXAMPLE 6 | EXAMPLE 7 | EXAMPLE 8 | EXAMPLE 9 | EXAMPLE 10 | COMPARATIVE EXAMPLE 18 |
|---|---|---|---|---|---|---|---|---|---|---|---|---|---|---|
| HOT MELT ADHESIVE AGENT: SOFTENING POINT [°C] | 100 | | | | | | | 110 | | | | | | |
| POSITIVE ELECTRODE ACTIVE MATERIAL: WEIGHT RATIO | 0.815 | | | | | | | | | | | | | |
| POSITIVE ELECTRODE ACTIVE MATERIAL: SPECIFIC SURFACE AREA [m²/g] | 0.83 | 0.83 | 0.83 | 1.18 | 1.53 | 1.53 | 1.53 | 0.83 | 0.83 | 0.83 | 1.18 | 1.53 | 1.53 | 1.53 |
| SOLID ELECTROLYTE: WEIGHT RATIO | 0.166 | | | | | | | | | | | | | |
| SOLID ELECTROLYTE: SPECIFIC SURFACE AREA [m²/g] | 6.6 | 7.8 | 9.0 | 8.5 | 7.5 | 9.1 | 9.9 | 6.6 | 7.8 | 9.0 | 8.5 | 7.5 | 9.1 | 9.9 |
| CONDUCTIVE MATERIAL: WEIGHT RATIO | 0.019 | | | | | | | | | | | | | |
| CONDUCTIVE MATERIAL: SPECIFIC SURFACE AREA [m²/g] | 12 | 12 | 12 | 14 | 16 | 16 | 16 | 12 | 12 | 12 | 14 | 16 | 16 | 16 |
| POSITIVE ELECTRODE TOTAL SPECIFIC SURFACE AREA [m²/g] | 2.0 | 2.2 | 2.4 | 2.6 | 2.8 | 3.0 | 3.2 | 2.0 | 2.2 | 2.4 | 2.6 | 2.8 | 3.0 | 3.2 |
| EVALUATION | × | ○ | ○ | ○ | ○ | ○ | × | × | ○ | ○ | ○ | ○ | ○ | × |

FIG.11

| | | Comparative Example 19 | Example 11 | Example 12 | Example 13 | Example 14 | Example 15 | Comparative Example 20 | Comparative Example 21 | Example 16 | Example 17 | Example 18 | Example 19 | Example 20 | Comparative Example 22 |
|---|---|---|---|---|---|---|---|---|---|---|---|---|---|---|---|
| Hot melt adhesive agent | Softening point [°C] | 120 | | | | | | | | 130 | | | | | |
| Positive electrode active material | Weight ratio | 0.815 | | | | | | | | | | | | | |
| | Specific surface area [m²/g] | 0.83 | 0.83 | 0.83 | 1.18 | 1.53 | 1.53 | 1.53 | 0.83 | 0.83 | 0.83 | 1.18 | 1.53 | 1.53 | 1.53 |
| Solid electrolyte | Weight ratio | 0.166 | | | | | | | | | | | | | |
| | Specific surface area [m²/g] | 6.6 | 7.8 | 9.0 | 8.5 | 7.5 | 9.1 | 9.9 | 6.6 | 7.8 | 9.0 | 8.5 | 7.5 | 9.1 | 9.9 |
| Conductive material | Weight ratio | 0.019 | | | | | | | | | | | | | |
| | Specific surface area [m²/g] | 12 | 12 | 12 | 14 | 16 | 16 | 16 | 12 | 12 | 12 | 14 | 16 | 16 | 16 |
| Positive electrode total specific surface area [m²/g] | | 2.0 | 2.2 | 2.4 | 2.6 | 2.8 | 3.0 | 3.2 | 2.0 | 2.2 | 2.4 | 2.6 | 2.8 | 3.0 | 3.2 |
| Evaluation | | × | ○ | ○ | ○ | ○ | ○ | × | × | ○ | ○ | ○ | ○ | ○ | × |

FIG.12

| | | COMPARATIVE EXAMPLE 23 | COMPARATIVE EXAMPLE 24 | COMPARATIVE EXAMPLE 25 | COMPARATIVE EXAMPLE 26 | COMPARATIVE EXAMPLE 27 | COMPARATIVE EXAMPLE 28 | COMPARATIVE EXAMPLE 29 |
|---|---|---|---|---|---|---|---|---|
| HOT MELT ADHESIVE AGENT | SOFTENING POINT [°C] | 140 | | | | | | |
| POSITIVE ELECTRODE ACTIVE MATERIAL | WEIGHT RATIO | 0.815 | | | | | | |
| | SPECIFIC SURFACE AREA [m²/g] | 0.83 | 0.83 | 0.83 | 1.18 | 1.53 | 1.53 | 1.53 |
| SOLID ELECTROLYTE | WEIGHT RATIO | 0.166 | | | | | | |
| | SPECIFIC SURFACE AREA [m²/g] | 6.6 | 7.8 | 9.0 | 8.5 | 7.5 | 9.1 | 9.9 |
| CONDUCTIVE MATERIAL | WEIGHT RATIO | 0.019 | | | | | | |
| | SPECIFIC SURFACE AREA [m²/g] | 12 | 12 | 12 | 14 | 16 | 16 | 16 |
| POSITIVE ELECTRODE TOTAL SPECIFIC SURFACE AREA [m²/g] | | 2.0 | 2.2 | 2.4 | 2.6 | 2.8 | 3.0 | 3.2 |
| EVALUATION | | × | × | × | × | × | × | × |

FIG.13

| | | EXAMPLE 1 | | | | | | | EXAMPLE 5 | | | | | | |
|---|---|---|---|---|---|---|---|---|---|---|---|---|---|---|---|
| | | EXAMPLE 1-1 | EXAMPLE 1-2 | EXAMPLE 1-3 | EXAMPLE 1-4 | EXAMPLE 1-5 | EXAMPLE 1-6 | EXAMPLE 1-7 | EXAMPLE 5-1 | EXAMPLE 5-2 | EXAMPLE 5-3 | EXAMPLE 5-4 | EXAMPLE 5-5 | EXAMPLE 5-6 | EXAMPLE 5-7 |
| HOT MELT ADHESIVE AGENT | SOFTENING POINT [°C] | 100 | | | | | | | 100 | | | | | | |
| POSITIVE ELECTRODE ACTIVE MATERIAL | WEIGHT RATIO | 0.815 | | | | | | | | | | | | | |
| | SPECIFIC SURFACE AREA [m²/g] | 0.83 | 1.53 | 0.57 | 0.74 | 0.83 | 1.53 | 0.47 | 1.53 | 0.83 | 1.72 | 1.55 | 1.53 | 0.83 | 1.81 |
| SOLID ELECTROLYTE | WEIGHT RATIO | 0.166 | | | | | | | | | | | | | |
| | SPECIFIC SURFACE AREA [m²/g] | 7.8 | 4.4 | 9.1 | 7.8 | 7.3 | 3.9 | 9.1 | 9.1 | 12.2 | 7.8 | 9.1 | 9.2 | 12.6 | 7.8 |
| CONDUCTIVE MATERIAL | WEIGHT RATIO | 0.019 | | | | | | | | | | | | | |
| | SPECIFIC SURFACE AREA [m²/g] | 12 | 12 | 12 | 16 | 16 | 16 | 16 | 16 | 16 | 16 | 12 | 12 | 12 | 12 |
| POSITIVE ELECTRODE TOTAL SPECIFIC SURFACE AREA [m²/g] | | 2.2 | 2.2 | 2.2 | 2.2 | 2.2 | 2.2 | 2.2 | 3.0 | 3.0 | 3.0 | 3.0 | 3.0 | 3.0 | 3.0 |
| EVALUATION | | ○ | ○ | ○ | ○ | ○ | ○ | ○ | ○ | ○ | ○ | ○ | ○ | ○ | ○ |

FIG. 14

| | | EXAMPLE 16 | | | | | | | EXAMPLE 20 | | | | | | |
|---|---|---|---|---|---|---|---|---|---|---|---|---|---|---|---|
| | | EXAMPLE 16-1 | EXAMPLE 16-2 | EXAMPLE 16-3 | EXAMPLE 16-4 | EXAMPLE 16-5 | EXAMPLE 16-6 | EXAMPLE 16-7 | EXAMPLE 20-1 | EXAMPLE 20-2 | EXAMPLE 20-3 | EXAMPLE 20-4 | EXAMPLE 20-5 | EXAMPLE 20-6 | EXAMPLE 20-7 |
| HOT MELT ADHESIVE AGENT | SOFTENING POINT [°C] | 130 | | | | | | | 130 | | | | | | |
| POSITIVE ELECTRODE ACTIVE MATERIAL | WEIGHT RATIO | 0.815 | | | | | | | | | | | | | |
| | SPECIFIC SURFACE AREA [m²/g] | 0.83 | 1.53 | 0.57 | 0.74 | 0.83 | 1.53 | 0.47 | 1.53 | 0.83 | 1.72 | 1.55 | 1.53 | 0.83 | 1.81 |
| SOLID ELECTROLYTE | WEIGHT RATIO | 0.166 | | | | | | | | | | | | | |
| | SPECIFIC SURFACE AREA [m²/g] | 7.8 | 4.4 | 9.1 | 7.8 | 7.3 | 3.9 | 9.1 | 9.1 | 12.2 | 7.8 | 9.1 | 9.2 | 12.6 | 7.8 |
| CONDUCTIVE MATERIAL | WEIGHT RATIO | 0.019 | | | | | | | | | | | | | |
| | SPECIFIC SURFACE AREA [m²/g] | 12 | 12 | 12 | 16 | 16 | 16 | 16 | 16 | 16 | 16 | 12 | 12 | 12 | 12 |
| POSITIVE ELECTRODE TOTAL SPECIFIC SURFACE AREA [m²/g] | | 2.2 | 2.2 | 2.2 | 2.2 | 2.2 | 2.2 | 2.2 | 3.0 | 3.0 | 3.0 | 3.0 | 3.0 | 3.0 | 3.0 |
| EVALUATION | | ○ | ○ | ○ | ○ | ○ | ○ | ○ | ○ | ○ | ○ | ○ | ○ | ○ | ○ |

FIG. 15

| | | COMPARATIVE EXAMPLE 9 ||||||| COMPARATIVE EXAMPLE 15 |||||||
|---|---|---|---|---|---|---|---|---|---|---|---|---|---|---|
| | | COMPARATIVE EXAMPLE 9-1 | COMPARATIVE EXAMPLE 9-2 | COMPARATIVE EXAMPLE 9-3 | COMPARATIVE EXAMPLE 9-4 | COMPARATIVE EXAMPLE 9-5 | COMPARATIVE EXAMPLE 9-6 | COMPARATIVE EXAMPLE 9-7 | COMPARATIVE EXAMPLE 15-1 | COMPARATIVE EXAMPLE 15-2 | COMPARATIVE EXAMPLE 15-3 | COMPARATIVE EXAMPLE 15-4 | COMPARATIVE EXAMPLE 15-5 | COMPARATIVE EXAMPLE 15-6 | COMPARATIVE EXAMPLE 15-7 |
| HOT MELT ADHESIVE AGENT | SOFTENING POINT [°C] | 90 |||||||  100 |||||||
| POSITIVE ELECTRODE ACTIVE MATERIAL | WEIGHT RATIO | 0.815 |||||||||||||||
| | SPECIFIC SURFACE AREA [m²/g] | 0.83 | 1.53 | 0.57 | 0.74 | 0.83 | 1.53 | 0.47 | 0.83 | 1.53 | 0.32 | 0.74 | 0.83 | 1.53 | 0.23 |
| SOLID ELECTROLYTE | WEIGHT RATIO | 0.166 |||||||||||||||
| | SPECIFIC SURFACE AREA [m²/g] | 7.8 | 4.4 | 9.1 | 7.8 | 7.3 | 3.9 | 9.1 | 6.6 | 3.2 | 9.1 | 6.6 | 6.1 | 2.7 | 9.1 |
| CONDUCTIVE MATERIAL | WEIGHT RATIO | 0.019 |||||||||||||||
| | SPECIFIC SURFACE AREA [m²/g] | 12 | 12 | 12 | 16 | 16 | 16 | 16 | 12 | 12 | 12 | 16 | 16 | 16 | 16 |
| POSITIVE ELECTRODE TOTAL SPECIFIC SURFACE AREA [m²/g] | | 2.2 | 2.2 | 2.2 | 2.2 | 2.2 | 2.2 | 2.2 | 2.0 | 2.0 | 2.0 | 2.0 | 2.0 | 2.0 | 2.0 |
| EVALUATION | | × | × | × | × | × | × | × | × | × | × | × | × | × | × |

FIG.16

| | | COMPARATIVE EXAMPLE 13 | | | | | | | COMPARATIVE EXAMPLE 16 | | | | | | |
|---|---|---|---|---|---|---|---|---|---|---|---|---|---|---|---|
| | | COMPARATIVE EXAMPLE 13-1 | COMPARATIVE EXAMPLE 13-2 | COMPARATIVE EXAMPLE 13-3 | COMPARATIVE EXAMPLE 13-4 | COMPARATIVE EXAMPLE 13-5 | COMPARATIVE EXAMPLE 13-6 | COMPARATIVE EXAMPLE 13-7 | COMPARATIVE EXAMPLE 16-1 | COMPARATIVE EXAMPLE 16-2 | COMPARATIVE EXAMPLE 16-3 | COMPARATIVE EXAMPLE 16-4 | COMPARATIVE EXAMPLE 16-5 | COMPARATIVE EXAMPLE 16-6 | COMPARATIVE EXAMPLE 16-7 |
| HOT MELT ADHESIVE AGENT | SOFTENING POINT [°C] | 90 | | | | | | | 100 | | | | | | |
| POSITIVE ELECTRODE ACTIVE MATERIAL | WEIGHT RATIO | 0.815 | | | | | | | | | | | | | |
| | SPECIFIC SURFACE AREA [m²/g] | 1.53 | 0.83 | 1.72 | 1.55 | 1.53 | 0.83 | 1.81 | 1.53 | 0.83 | 1.96 | 1.79 | 1.53 | 0.83 | 2.06 |
| SOLID ELECTROLYTE | WEIGHT RATIO | 0.166 | | | | | | | | | | | | | |
| | SPECIFIC SURFACE AREA [m²/g] | 9.1 | 12.2 | 7.8 | 9.1 | 9.2 | 12.6 | 7.8 | 9.9 | 13.4 | 7.8 | 9.1 | 10.4 | 13.8 | 7.8 |
| CONDUCTIVE MATERIAL | WEIGHT RATIO | 0.019 | | | | | | | | | | | | | |
| | SPECIFIC SURFACE AREA [m²/g] | 16 | 16 | 16 | 12 | 12 | 12 | 12 | 16 | 16 | 16 | 12 | 12 | 12 | 12 |
| POSITIVE ELECTRODE TOTAL SPECIFIC SURFACE AREA [m²/g] | | 3.0 | 3.0 | 3.0 | 3.0 | 3.0 | 3.0 | 3.0 | 3.2 | 3.2 | 3.2 | 3.2 | 3.2 | 3.2 | 3.2 |
| EVALUATION | | × | × | × | × | × | × | × | × | × | × | × | × | × | × |

FIG.17

| | | COMPARATIVE EXAMPLE 21 | | | | | | | COMPARATIVE EXAMPLE 24 | | | | | | |
|---|---|---|---|---|---|---|---|---|---|---|---|---|---|---|---|
| | | COMPARATIVE EXAMPLE 21-1 | COMPARATIVE EXAMPLE 21-2 | COMPARATIVE EXAMPLE 21-3 | COMPARATIVE EXAMPLE 21-4 | COMPARATIVE EXAMPLE 21-5 | COMPARATIVE EXAMPLE 21-6 | COMPARATIVE EXAMPLE 21-7 | COMPARATIVE EXAMPLE 24-1 | COMPARATIVE EXAMPLE 24-2 | COMPARATIVE EXAMPLE 24-3 | COMPARATIVE EXAMPLE 24-4 | COMPARATIVE EXAMPLE 24-5 | COMPARATIVE EXAMPLE 24-6 | COMPARATIVE EXAMPLE 24-7 |
| HOT MELT ADHESIVE AGENT | SOFTENING POINT [°C] | 130 | | | | | | | 140 | | | | | | |
| POSITIVE ELECTRODE ACTIVE MATERIAL | WEIGHT RATIO | 0.815 | | | | | | | | | | | | | |
| | SPECIFIC SURFACE AREA [$m^2/g$] | 0.83 | 1.53 | 0.32 | 0.74 | 0.83 | 1.53 | 0.23 | 0.83 | 1.53 | 0.57 | 0.74 | 0.83 | 1.53 | 0.47 |
| SOLID ELECTROLYTE | WEIGHT RATIO | 0.166 | | | | | | | | | | | | | |
| | SPECIFIC SURFACE AREA [$m^2/g$] | 6.6 | 3.2 | 9.1 | 6.6 | 6.1 | 2.7 | 9.1 | 7.8 | 4.4 | 9.1 | 7.8 | 7.3 | 3.9 | 9.1 |
| CONDUCTIVE MATERIAL | WEIGHT RATIO | 0.019 | | | | | | | | | | | | | |
| | SPECIFIC SURFACE AREA [$m^2/g$] | 12 | 12 | 12 | 16 | 16 | 16 | 16 | 12 | 12 | 12 | 16 | 16 | 16 | 16 |
| POSITIVE ELECTRODE TOTAL SPECIFIC SURFACE AREA [$m^2/g$] | | 2.0 | 2.0 | 2.0 | 2.0 | 2.0 | 2.0 | 2.0 | 2.2 | 2.2 | 2.2 | 2.2 | 2.2 | 2.2 | 2.2 |
| EVALUATION | | × | × | × | × | × | × | × | × | × | × | × | × | × | × |

FIG.18

| | | COMPARATIVE EXAMPLE 22 | | | | | | | COMPARATIVE EXAMPLE 28 | | | | | | |
|---|---|---|---|---|---|---|---|---|---|---|---|---|---|---|---|
| | | COMPARATIVE EXAMPLE 22-1 | COMPARATIVE EXAMPLE 22-2 | COMPARATIVE EXAMPLE 22-3 | COMPARATIVE EXAMPLE 22-4 | COMPARATIVE EXAMPLE 22-5 | COMPARATIVE EXAMPLE 22-6 | COMPARATIVE EXAMPLE 22-7 | COMPARATIVE EXAMPLE 28-1 | COMPARATIVE EXAMPLE 28-2 | COMPARATIVE EXAMPLE 28-3 | COMPARATIVE EXAMPLE 28-4 | COMPARATIVE EXAMPLE 28-5 | COMPARATIVE EXAMPLE 28-6 | COMPARATIVE EXAMPLE 28-7 |
| HOT MELT ADHESIVE AGENT | SOFTENING POINT [°C] | 130 | | | | | | | 140 | | | | | | |
| POSITIVE ELECTRODE ACTIVE MATERIAL | WEIGHT RATIO | 0.815 | | | | | | | | | | | | | |
| | SPECIFIC SURFACE AREA [m²/g] | 1.53 | 0.83 | 1.96 | 1.79 | 1.53 | 0.83 | 2.06 | 1.53 | 0.83 | 1.72 | 1.55 | 1.53 | 0.83 | 1.81 |
| SOLID ELECTROLYTE | WEIGHT RATIO | 0.166 | | | | | | | | | | | | | |
| | SPECIFIC SURFACE AREA [m²/g] | 9.9 | 13.4 | 7.8 | 9.1 | 10.4 | 13.8 | 7.8 | 9.1 | 12.2 | 7.8 | 9.1 | 9.2 | 12.6 | 7.8 |
| CONDUCTIVE MATERIAL | WEIGHT RATIO | 0.019 | | | | | | | | | | | | | |
| | SPECIFIC SURFACE AREA [m²/g] | 16 | 16 | 16 | 12 | 12 | 12 | 12 | 16 | 16 | 16 | 12 | 12 | 12 | 12 |
| POSITIVE ELECTRODE TOTAL SPECIFIC SURFACE AREA [m²/g] | | 3.2 | 3.2 | 3.2 | 3.2 | 3.2 | 3.2 | 3.2 | 3.0 | 3.0 | 3.0 | 3.0 | 3.0 | 3.0 | 3.0 |
| EVALUATION | | × | × | × | × | × | × | × | × | × | × | × | × | × | × |

ELECTRODE STRUCTURE

CROSS REFERENCE TO RELATED APPLICATIONS

This nonprovisional application claims priority to Japanese Patent Application No. 2020-115603 filed on Jul. 3, 2020, with the Japan Patent Office, the entire contents of which are hereby incorporated by reference.

BACKGROUND

Field

The present disclosure relates to an electrode structure.

Description of the Background Art

For example, Japanese Patent Laying-Open No. 2004-273181 discloses a battery electrode plate in which an adhesive layer composed of a polyamideimide resin containing carbon and an active material layer are stacked in this order on at least one surface of a current collector. The thickness of the adhesive layer is 1 μm to 4 μm.

SUMMARY

In the battery electrode plate described in Japanese Patent Laying-Open No. 2004-273181, it is concerned that a positive electrode collector foil is detached from a positive electrode layer under a high temperature environment as in charging, discharging, or the like.

An object of the present disclosure is to provide an electrode structure in which a positive electrode collector foil can be suppressed from being detached from a positive electrode layer.

An electrode structure according to one aspect of the present disclosure includes: a positive electrode layer; and a positive electrode collector member connected to the positive electrode layer, wherein the positive electrode layer includes a positive electrode active material, a solid electrolyte, and a conductive material, the positive electrode collector member includes a positive electrode collector foil, a carbon film that covers at least a portion of the positive electrode collector foil, and a hot melt adhesive agent that adheres the positive electrode layer and the carbon film to each other, a positive electrode total specific surface area is more than or equal to 2.2 m$^2$/g and less than or equal to 3.0 m$^2$/g, the positive electrode total specific surface area being represented by a total of a product of weight ratio and specific surface area of the positive electrode active material in a group consisting of the positive electrode active material, the solid electrolyte, and the conductive material, a product of weight ratio and specific surface area of the solid electrolyte in the group, and a product of weight ratio and specific surface area of the conductive material in the group, and a softening point of the hot melt adhesive agent is more than or equal to 100° C. and less than or equal to 130° C.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 illustrates a table showing a material composition of the electrode structure in Examples.

FIG. 8 illustrates a table showing examples of the embodiment and comparative examples and evaluation results thereof.

FIG. 9 illustrates a table showing configurations and evaluation results of the comparative examples.

FIG. 10 illustrates a table showing configurations and evaluation results of the examples of the embodiment and the comparative examples.

FIG. 11 illustrates a table showing configurations and evaluation results of the examples of the embodiment and the comparative examples.

FIG. 12 illustrates a table showing configurations and evaluation results of the comparative examples.

FIG. 13 illustrates a table showing configurations and evaluation results of a plurality of Examples 1 and a plurality of Examples 5.

FIG. 14 illustrates a table showing configurations and evaluation results of a plurality of Examples 16 and a plurality of Examples 20.

FIG. 15 illustrates a table showing configurations and evaluation results of a plurality of Comparative Examples 9 and a plurality of Comparative Examples 15.

FIG. 16 illustrates a table showing configurations and evaluation results of a plurality of Comparative Examples 13 and a plurality of Comparative Examples 16.

FIG. 17 illustrates a table showing configurations and evaluation results of a plurality of Comparative Examples 21 and a plurality of Comparative Examples 24.

FIG. 18 illustrates a table showing configurations and evaluation results of a plurality of Comparative Examples 22 and a plurality of Comparative Examples 28.

DETAILED DESCRIPTION

Figure 1:
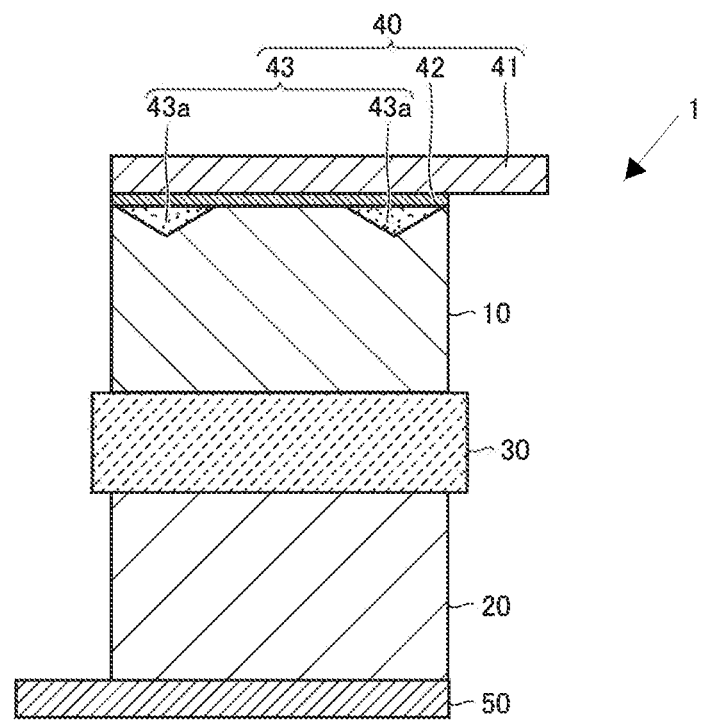
FIG. 1 is a cross sectional view schematically showing a configuration of an electrode structure according to an embodiment of the present disclosure.

Embodiments of the present disclosure will be described with reference to the figures. It should be noted that in the figures to which reference will be made below, the same or corresponding members are denoted by the same reference numerals.

FIG. 1 is a cross sectional view schematically showing a configuration of an electrode structure according to an embodiment of the present disclosure. In some embodiments, this electrode structure 1 is used for an all-solid state battery, for example.

As shown in FIG. 1, electrode structure 1 includes a positive electrode layer 10, a negative electrode layer 20, a separator layer 30, a positive electrode collector member 40, and a negative electrode collector member 50. Negative electrode layer 20, separator layer 30, and positive electrode layer 10 are stacked in this order on negative electrode collector member 50. Positive electrode collector member 40 is connected to positive electrode layer 10. FIG. 7 shows an exemplary material composition of electrode structure 1.

Positive electrode layer 10 includes a positive electrode active material, a solid electrolyte, a conductive material, a binder, a solvent, and a transfer foil.

In the present embodiment, a positive electrode total specific surface area is more than or equal to 2.2 m²/g and less than or equal to 3.0 m²/g, the positive electrode total specific surface area being represented by a total of a product of weight ratio and specific surface area of the positive electrode active material in a group consisting of the positive electrode active material, the solid electrolyte, and the conductive material, a product of weight ratio and specific surface area of the solid electrolyte in the group, and a product of weight ratio and specific surface area of the conductive material in the group.

In some embodiments, the product of the weight ratio and specific surface area of the positive electrode active material in the group is more than or equal to 0.383 m²/g and less than or equal to 1.48 m²/g.

In some embodiments, the product of the weight ratio and specific surface area of the solid electrolyte in the group is more than or equal to 0.647 m²/g and less than or equal to 2.09 m²/g.

In some embodiments, the product of the weight ratio and specific surface area of the conductive material in the group is more than or equal to 0.228 m²/g and less than or equal to 0.304 m²/g.

Negative electrode layer 20 includes a negative electrode active material, a solid electrolyte, a conductive material, a binder, a solvent, and a collector foil/transfer foil.

Separator layer 30 is disposed between positive electrode layer 10 and negative electrode layer 20. Separator layer 30 includes a solid electrolyte, a binder, a solvent, and a transfer foil.

Negative electrode collector member 50 is connected to negative electrode layer 20.

Positive electrode collector member 40 is adhered to positive electrode layer 10. Positive electrode collector member 40 has a positive electrode collector foil 41, a carbon film 42, and a hot melt adhesive agent 43.

Positive electrode collector foil 41 is composed of a metal foil such as aluminum. The thickness of positive electrode collector foil 41 is set to, for example, about 15 μm.

Carbon film 42 covers at least a portion of a surface of positive electrode collector foil 41. In some embodiments, the thickness of carbon film 42 is set to more than or equal to 1 μm and less than or equal to 3 μm, or is set to 2 μm.

Carbon film 42 is formed to have a quadrangular shape. A dimension L1 of the quadrangular portion of carbon film 42 in the long-side direction (see FIG. 2) is set to 225 mm, for example. A dimension L2 of carbon film 42 in the short-side direction (see FIG. 2) is set to 64.7 mm, for example.

In the present embodiment, a portion of positive electrode collector foil 41 is exposed from carbon film 42. The region of positive electrode collector foil 41 exposed from carbon film 42 can be electrically connected to a different member.

Hot melt adhesive agent 43 adheres positive electrode layer 10 and carbon film 42 to each other. Hot melt adhesive agent 43 is composed of ethylene-vinylacetate copolymer (EVA). Vinylacetate in the ethylene-vinylacetate copolymer has an adhesive function. Therefore, when the ratio of the vinylacetate in the ethylene-vinylacetate copolymer becomes large, adhesiveness of hot melt adhesive agent 43 is increased. On the other hand, when the ratio of the vinylacetate in the ethylene-vinylacetate copolymer becomes large, the softening point of hot melt adhesive agent 43 becomes low. In the present embodiment, the softening point of hot melt adhesive agent 43 is more than or equal to 100° C. and less than or equal to 130° C.

Figure 2:
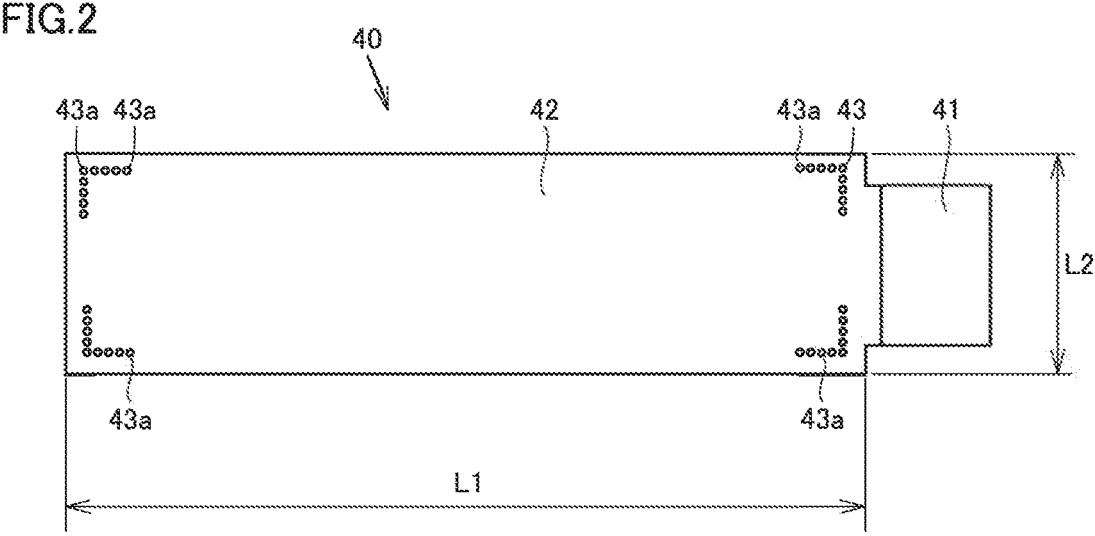
FIG. 2 is a plan view of a positive electrode collector member.

Hot melt adhesive agent 43 includes a plurality of adhesive elements 43a disposed to be separated from each other. As shown in FIG. 2, in the present embodiment, nine adhesive elements 43a are provided at each of the four corner portions of carbon film 42. It should be noted that each of FIGS. 2 to 4 shows adhesive elements 43a each in a state before being adhered to positive electrode layer 10.

Figure 3:
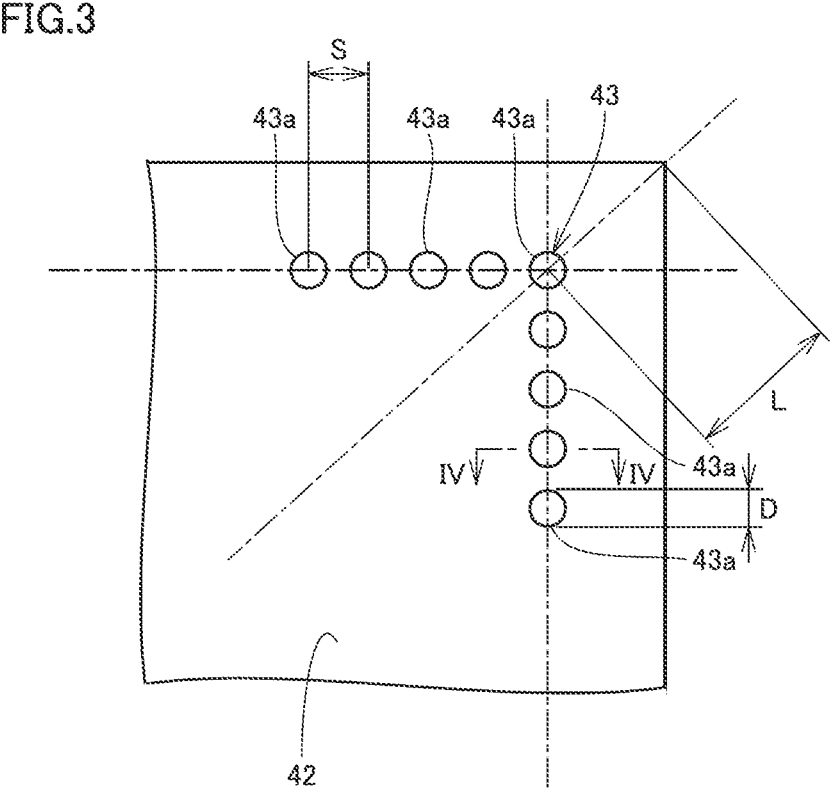
FIG. 3 is an enlarged view of each spot of a hot melt adhesive agent.

As shown in FIGS. 2 and 3, at each of the corner portions of carbon film 42, five adhesive elements 43a are arranged at equal intervals along the long-side direction of carbon film 42, and five adhesive elements 43a are arranged at equal intervals along a direction orthogonal to the long-side direction. In some embodiments, a distance L (see FIG. 3) between the apex of each corner portion of carbon film 42 and an adhesive element 43a disposed at a position closest to the apex is set to more than or equal to 1.75 √2 mm and less than or equal to 6√2 mm. In some embodiments, a distance S (see FIG. 3) between the centers of adjacent adhesive elements 43a is set to more than or equal to 1.5 mm and less than or equal to 3.2 mm.

Figure 4:
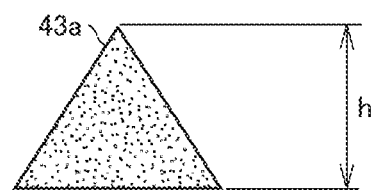
FIG. 4 is a cross sectional view taken along a line IV-IV in FIG. 3.

As shown in FIGS. 3 and 4, each of adhesive elements 43a in the state before being adhered to positive electrode layer 10 is formed to have a conical shape. In some embodiments, a diameter D (see FIG. 3) of each adhesive element 43a is set to more than or equal to 150 μm and less than or equal to 1700 μm or is set to more than or equal to 210 μm and less than or equal to 1500 μm. In some embodiments, a height h (see FIG. 4) of each adhesive element 43a is set to more than or equal to 1.5 μm and less than or equal to 130 μm or is set to more than or equal to 2.5 μm and less than or equal to 130 μm. In some embodiments, in order to suppress detachment from positive electrode layer 10 at a high temperature (for example, more than or equal to 80° C.), the volume of each adhesive element 43a is more than or equal to 1471875 μm³. In some embodiments, the volume of each adhesive element 43a is less than or equal to 98308167 μm³.

Figure 5:
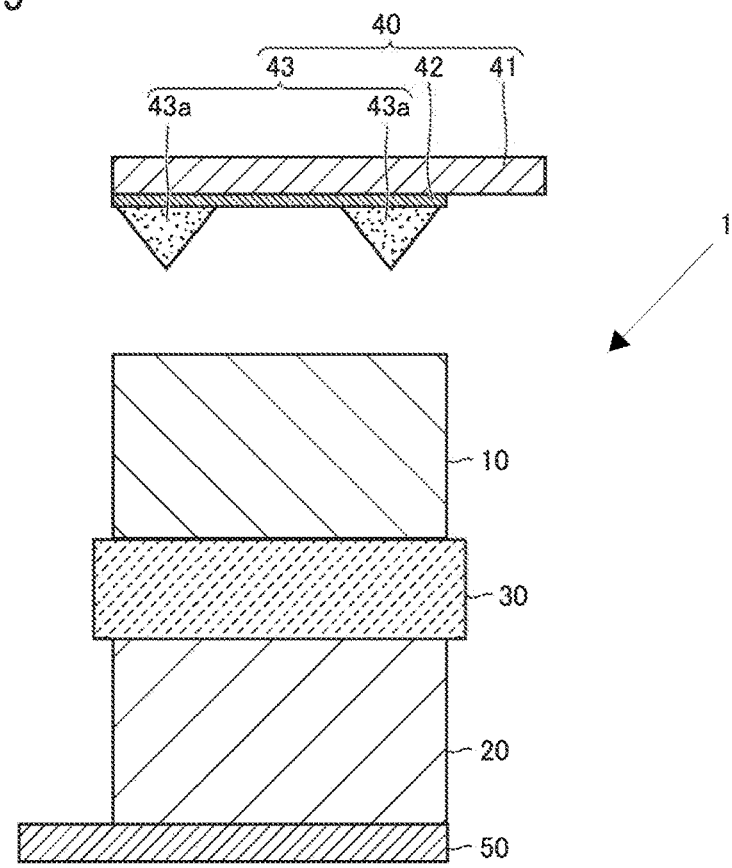
FIG. 5 is a diagram schematically showing a state before adhering the positive electrode collector member to a positive electrode layer.

Next, a process of manufacturing electrode structure 1 will be described with reference to FIGS. 5 and 6.

First, negative electrode layer 20, separator layer 30, and positive electrode layer 10 are stacked in this order on negative electrode collector member 50. Positive electrode collector member 40 is disposed on positive electrode layer 10 in such a posture that each of adhesive elements 43a faces positive electrode layer 10.

Figure 6:
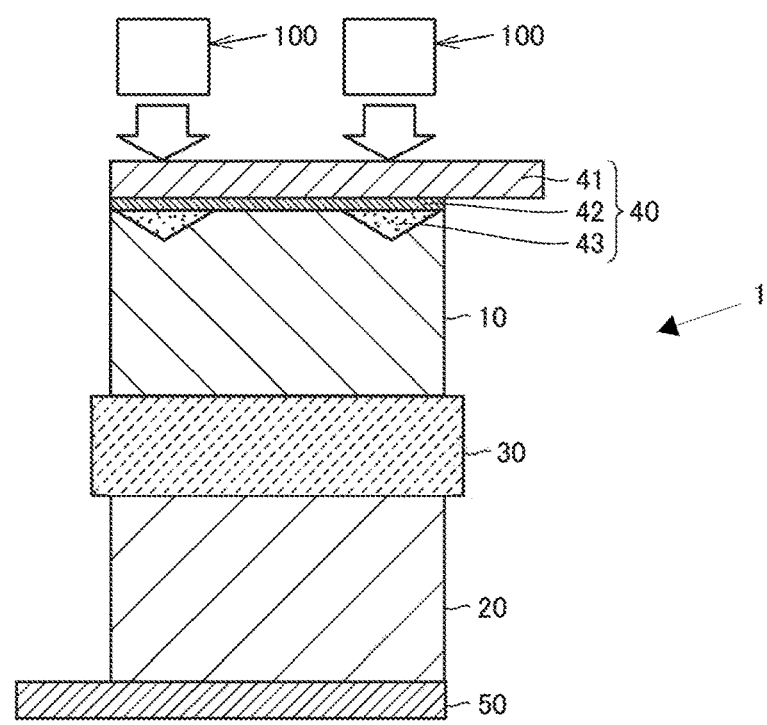
FIG. 6 is a diagram schematically showing a process of adhering the positive electrode collector member to the positive electrode layer.

Then, as shown in FIG. 6, regions of positive electrode collector foil 41 corresponding to respective adhesive elements 43a are hot-pressed by heat blocks 100. On this occasion, each adhesive element 43a is melted and hardened. Therefore, positive electrode layer 10 and positive electrode collector member 40 are adhered to each other.

The temperature of the hot press is set to 140° C., for example. However, the temperature of the hot press may be selected in a range of 80° C. to 200° C. In the present embodiment, the temperature of the hot press means the temperature of each heat block.

A time for the hot press is set to, for example, 5 seconds. However, the time for the hot press may be selected in a range of 1 second to 1 minute.

A pressure of the hot press is set to, for example, 0.5 MPa. However, the pressure of the hot press may be selected in a range of 0.1 MPa to 1 MPa.

As described above, in electrode structure 1 of the present embodiment, since the positive electrode total specific surface area is more than or equal to 2.2 m²/g, the surface areas of the positive electrode active material, the solid electrolyte, and the conductive material in contact with hot melt adhesive agent 43 are effectively secured. Since the positive electrode total specific surface area is less than or equal to 3.0 $m^2/g$, an amount of hot melt adhesive agent 43 with respect to the surface areas of the positive electrode active material, the solid electrolyte, and the conductive material is suppressed from being insufficient. Further, since the softening point of hot melt adhesive agent 43 is more than or equal to 100° C., hot melt adhesive agent 43 is suppressed from being melted again under a high temperature environment (for example, 80° C.) as in charging, discharging, or the like. Therefore, in this electrode structure 1, positive electrode collector foil 41 is suppressed from being detached from positive electrode layer 10.

EXAMPLES

Next, with reference to FIGS. 8 to 18, the following describes an evaluation test as to whether or not positive electrode collector foil 41 is detached from positive electrode layer 10 in each of examples of the above-described embodiment and comparative examples.

FIG. 8 shows a result of the evaluation test in each of the examples of the embodiment and the comparative examples. In FIG. 8, the vertical axis represents the positive electrode total specific surface area [$m^2/g$], and the horizontal axis represents the softening point [° C.] of hot melt adhesive agent 43.

In FIGS. 8 to 18, "O" indicates that no detachment occurred, and "X" indicates that detachment occurred (performance was decreased). As shown in FIG. 8, in each of the examples of the embodiment, the evaluation result was "O", whereas in each of the comparative examples, the evaluation result was "X". It should be noted that in FIG. 8, a region indicating each of the examples of the embodiment is surrounded by a thick line.

FIGS. 9 to 12 show configurations and evaluation results of Examples 1 to 20 of the embodiment and Comparative Examples 1 to 29. In each of the examples of the embodiment and the comparative examples, the weight ratio of the positive electrode active material in the above-described group was 0.815, the weight ratio of the solid electrolyte in the group was 0.166, and the weight ratio of the conductive material in the group was 0.019.

As shown in FIGS. 9 to 12, it was confirmed that no detachment occurred in each of the examples of the embodiment, whereas detachment occurred in each of the comparative examples.

Then, a more detailed test was performed onto a boundary of the region indicating each of the examples of the embodiment (the region surrounded by the thick line in FIG. 8). Specifically, for each of Examples 1, 5, 16, and 20 of the embodiment and Comparative Examples 9, 13, 15, 16, 21, 22, 24, and 28, seven patterns having different configurations were subjected to the test.

FIGS. 13 to 18 show results thereof. In these tests, the product of the weight ratio and specific surface area of the positive electrode active material in the group was adjusted to fall within a range of more than or equal to 0.383 $m^2/g$ and less than or equal to 1.48 $m^2/g$. The product of the weight ratio and specific surface area of the solid electrolyte in the group was adjusted to fall within a range of more than or equal to 0.647 $m^2/g$ and less than or equal to 2.09 $m^2/g$. The product of the weight ratio and specific surface area of the conductive material in the group was adjusted to fall within a range of more than or equal to 0.228 $m^2/g$ and less than or equal to 0.304 $m^2/g$.

As shown in FIGS. 13 to 18, in each of Examples 1, 5, 16 and 20 of the embodiment, all the evaluation results were "O", whereas in each of Comparative Examples 9, 13, 15, 16, 21, 22, 24 and 28, all the evaluation results were "X".

In view of the above, it was confirmed that since the positive electrode total specific surface area was more than or equal to 2.2 $m^2/g$ and less than or equal to 3.0 $m^2/g$ and the softening point of hot melt adhesive agent 43 was more than or equal to 100° C. and less than or equal to 130° C., positive electrode collector foil 41 was effectively suppressed from being detached from positive electrode layer 10.

It will be appreciated by one having ordinary skill in the art that the above-described illustrative embodiments and examples are specific examples of the following aspects.

The electrode structure includes: a positive electrode layer; and a positive electrode collector member connected to the positive electrode layer, wherein the positive electrode layer includes a positive electrode active material, a solid electrolyte, and a conductive material, the positive electrode collector member includes a positive electrode collector foil, a carbon film that covers at least a portion of the positive electrode collector foil, and a hot melt adhesive agent that adheres the positive electrode layer and the carbon film to each other, a positive electrode total specific surface area is more than or equal to 2.2 $m^2/g$ and less than or equal to 3.0 $m^2/g$, the positive electrode total specific surface area being represented by a total of a product of weight ratio and specific surface area of the positive electrode active material in a group consisting of the positive electrode active material, the solid electrolyte, and the conductive material, a product of weight ratio and specific surface area of the solid electrolyte in the group, and a product of weight ratio and specific surface area of the conductive material in the group, and a softening point of the hot melt adhesive agent is more than or equal to 100° C. and less than or equal to 130° C.

In this electrode structure, since the positive electrode total specific surface area is more than or equal to 2.2 $m^2/g$, the surface areas of the positive electrode active material, the solid electrolyte, and the conductive material in contact with the hot melt adhesive agent are effectively secured. Since the positive electrode total specific surface area is less than or equal to 3.0 $m^2/g$, an amount of the hot melt adhesive agent with respect to the surface areas of the positive electrode active material, the solid electrolyte, and the conductive material is suppressed from being insufficient. Further, since the softening point of the hot melt adhesive agent is more than or equal to 100° C., the hot melt adhesive agent is suppressed from being melted again under a high temperature environment as in charging, discharging, or the like. Therefore, in this electrode structure, the positive electrode collector foil is suppressed from being detached from the positive electrode layer.

In some embodiments, the product of the weight ratio and specific surface area of the positive electrode active material in the group is more than or equal to 0.383 $m^2/g$ and less than or equal to 1.48 $m^2/g$.

In some embodiments, the product of the weight ratio and specific surface area of the solid electrolyte in the group is more than or equal to 0.647 $m^2/g$ and less than or equal to 2.09 $m^2/g$.

In some embodiments, the product of the weight ratio and specific surface area of the conductive material in the group is more than or equal to 0.228 m²/g and less than or equal to 0.304 m²/g.

In some embodiments, the hot melt adhesive agent is composed of an ethylene-vinylacetate copolymer.

In this embodiment, adhesiveness of the hot melt adhesive agent at less than or equal to 130° C. is effectively secured.

In some embodiments, the hot melt adhesive agent has a plurality of adhesive elements disposed to be separated from each other, and a volume of each of the plurality of adhesive elements is more than or equal to 1471875 µm³.

In this way, the amount of the hot melt adhesive agent with respect to the surface areas of the positive electrode active material, the solid electrolyte, and the conductive material is more securely suppressed from being insufficient.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An electrode structure comprising:
   a positive electrode layer;
   a positive electrode collector member connected to the positive electrode layer, wherein the positive electrode layer includes
      a positive electrode active material,
      a solid electrolyte, and
      a conductive material,
   the positive electrode collector member includes
      a positive electrode collector foil,
      a carbon film that covers at least a portion of the positive electrode collector foil, and
      a hot melt adhesive agent that adheres the positive electrode layer and the carbon film to each other,
   a negative electrode layer,
   a separator layer disposed between the positive electrode layer and the negative electrode layer, and
   a negative electrode collector member connected to the negative electrode layer, wherein:
   a positive electrode total specific surface area is more than or equal to 2.2 m²/g and less than or equal to 3.0 m²/g, the positive electrode total specific surface area being represented by a total of a product of weight ratio and specific surface area of the positive electrode active material in a group consisting of the positive electrode active material, the solid electrolyte, and the conductive material, a product of weight ratio and specific surface area of the solid electrolyte in the group, and a product of weight ratio and specific surface area of the conductive material in the group,
   a softening point of the hot melt adhesive agent is more than or equal to 100° C. and less than or equal to 130° C.,
   the hot melt adhesive agent has a plurality of adhesive elements disposed to be separated from each other,
   a volume of each of the plurality of adhesive elements is more than or equal to 1471875 µm³,
   the carbon film has a quadrangular shape,
   nine adhesive elements are provided at each of four corner portions of the carbon film,
   at each of the four corner portions of the carbon film, five adhesive elements are arranged at equal intervals along a long-side direction of the carbon film, and five adhesive elements are arranged at equal intervals along a direction orthogonal to the long-side direction,
   wherein a distance between an apex of each corner portion of the carbon film and an adhesive element is from 1.75√2 mm to 6√2 mm, and wherein a distance between centers of adjacent adhesive elements are from 1.5 mm to 3.2 mm.

2. The electrode structure according to claim 1, wherein the product of the weight ratio and specific surface area of the positive electrode active material in the group is more than or equal to 0.383 m²/g and less than or equal to 1.48 m²/g.

3. The electrode structure according to claim 1, wherein the product of the weight ratio and specific surface area of the solid electrolyte in the group is more than or equal to 0.647 m²/g and less than or equal to 2.09 m²/g.

4. The electrode structure according to claim 1, wherein the product of the weight ratio and specific surface area of the conductive material in the group is more than or equal to 0.228 m²/g and less than or equal to 0.304 m²/g.

5. The electrode structure according to claim 1, wherein the hot melt adhesive agent is composed of an ethylene-vinylacetate copolymer.

6. The electrode structure according to claim 1, wherein the carbon film has a thickness from 1 µm to 3 µm.

7. The electrode structure according to claim 1, wherein:
   the product of the weight ratio and specific surface area of the positive electrode active material in the group is more than or equal to 0.383 m²/g and less than or equal to 1.48 m²/g;
   the product of the weight ratio and specific surface area of the solid electrolyte in the group is more than or equal to 0.647 m²/g and less than or equal to 2.09 m²/g; and
   the product of the weight ratio and specific surface area of the conductive material in the group is more than or equal to 0.228 m²/g and less than or equal to 0.304 m²/g.

8. The electrode structure according to claim 7, wherein:
   the hot melt adhesive agent is composed of an ethylene-vinylacetate copolymer; and
   the carbon film has a thickness from 1 µm to 3 µm.

9. The electrode structure according to claim 1, wherein the negative electrode layer, the separator layer, and the positive electrode layer are stacked in this order on the negative electrode current collector.

10. The electrode structure according to claim 9, wherein the positive electrode current collector member is disposed on the positive electrode layer such that each of the plurality of adhesive elements faces the positive electrode layer.

11. The electrode structure according to claim 10, wherein each of the plurality of adhesive elements, in the state before being adhered to the positive electrode layer, is formed to have a conical shape.

12. The electrode structure according to claim 11, wherein:
   a diameter of each of the plurality of adhesive elements, in the state before being adhered to the positive electrode layer, is greater than or equal to 210 µm and less than or equal to 1500 µm,
   a height of each of the plurality of adhesive elements, in the state before being adhered to the positive electrode layer, is greater than or equal to 2.5 µm and less than or equal to 130 µm, and
   a volume of each of the plurality of adhesive elements, in the state before being adhered to the positive electrode layer, is greater than or equal to 1471875 µm³ and less than or equal to 98308167 µm³.

13. The electrode structure according to claim 12, wherein only regions of the positive electrode collector foil corresponding to respective adhesive elements are hot-pressed by a heat block.

* * * * *